G. T. JOHNSON.
FLUID CLUTCH.
APPLICATION FILED JUNE 6, 1911.

1,017,216.

Patented Feb. 13, 1912.

3 SHEETS—SHEET 1.

Witnesses
E Larson
M R Wilson

Inventor
Gustave T. Johnson
By
Attorneys

G. T. JOHNSON.
FLUID CLUTCH.
APPLICATION FILED JUNE 6, 1911.

1,017,216.

Patented Feb. 13, 1912.
3 SHEETS—SHEET 2.

Witnesses
E. Larson
M. R. Wilson

Inventor
Gustave T. Johnson

By
Attorneys

UNITED STATES PATENT OFFICE.

GUSTAVE T. JOHNSON, OF CHICAGO, ILLINOIS.

FLUID-CLUTCH.

1,017,216.   Specification of Letters Patent.   Patented Feb. 13, 1912.

Application filed June 6, 1911. Serial No. 631,580.

*To all whom it may concern:*

Be it known that I, GUSTAVE T. JOHNSON, a subject of the King of Sweden, residing at Chicago, in the county of Cook and State of Illinois, have invented certain new and useful Improvements in Fluid-Clutches, of which the following is a specification.

This invention relates to that class of clutches in which liquid is employed as a medium for connecting the driving and driven elements.

It is the object of the invention to provide a clutch of the kind stated which is simple in construction and highly efficient in operation, and also to provide a clutch by which motion may be transmitted at different rates of speed.

The invention also has for its object to provide an improved valve mechanism controlling the operation of the clutch, the valve being balanced so that it does not require locking means for holding it in position.

Other objects and advantages of the invention will be apparent from the detailed description appearing hereinafter, and in order that the invention may be better understood, reference is had to the accompanying drawings forming a part of this specification in which—

Figure 1:
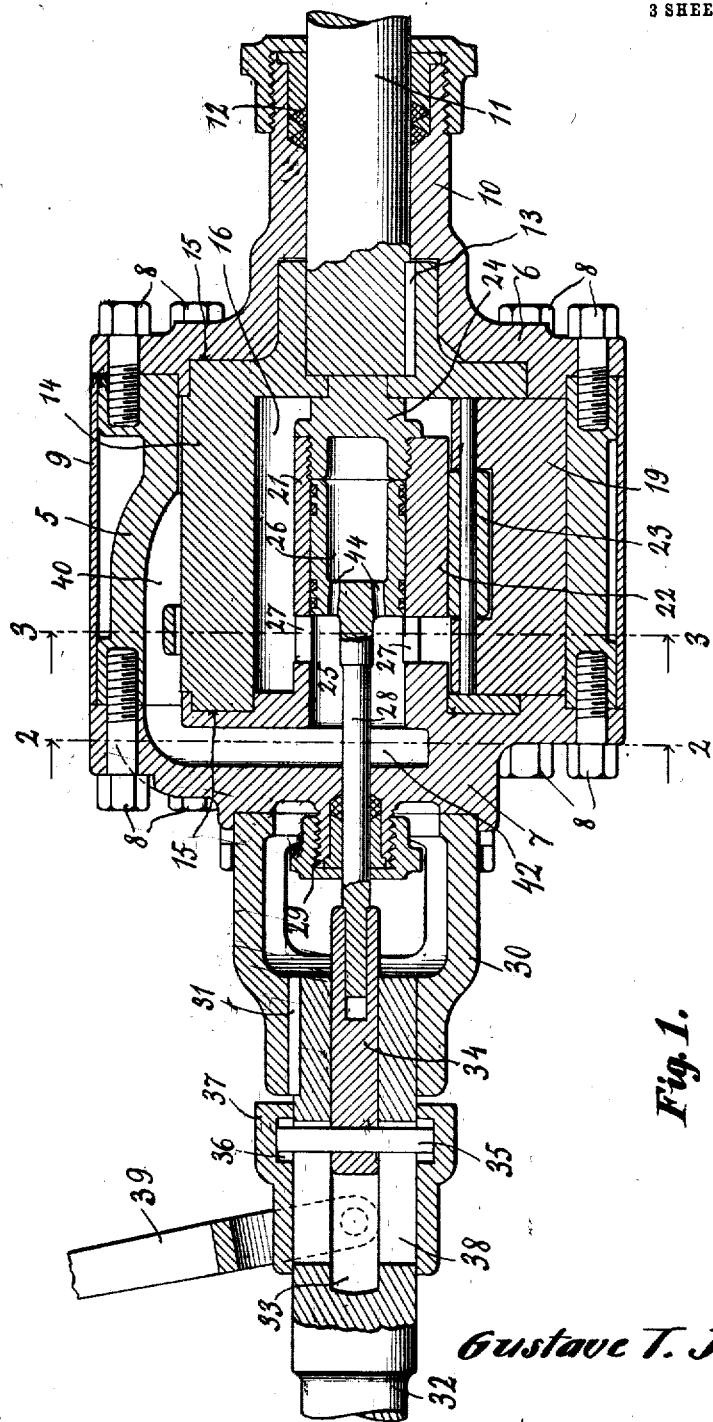
Figure 2:
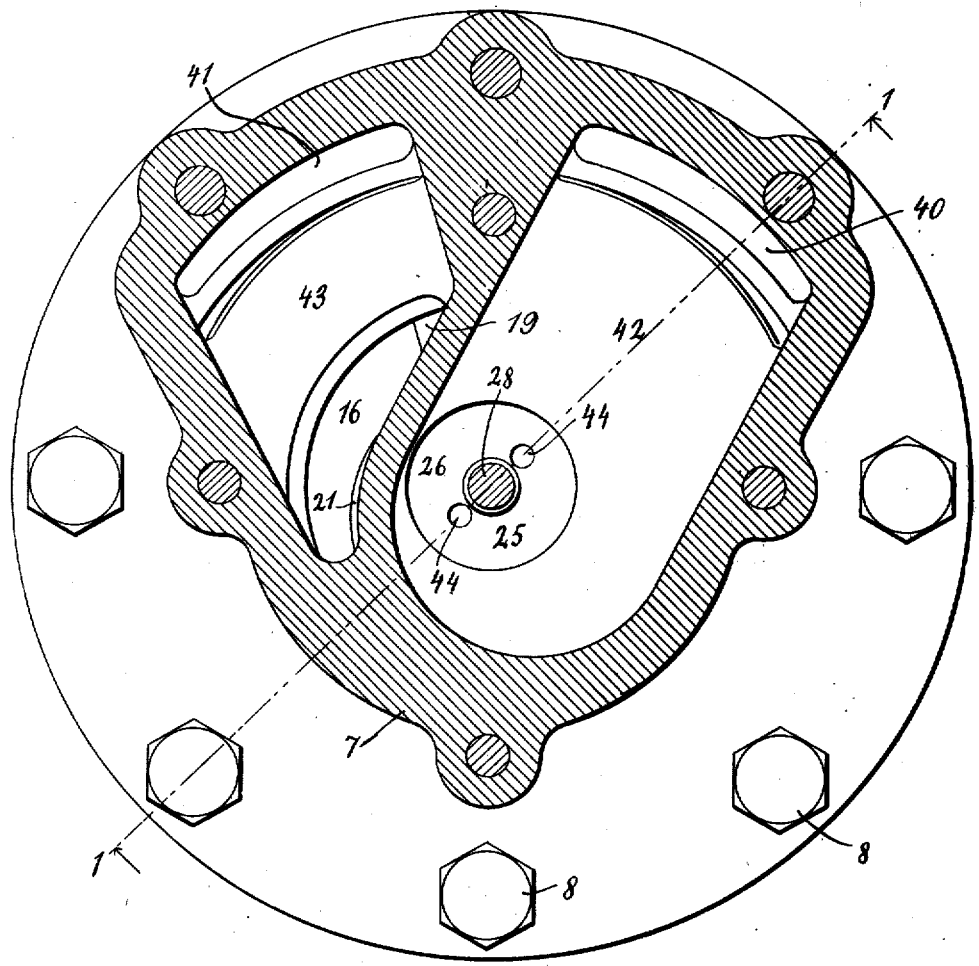
Figure 3:
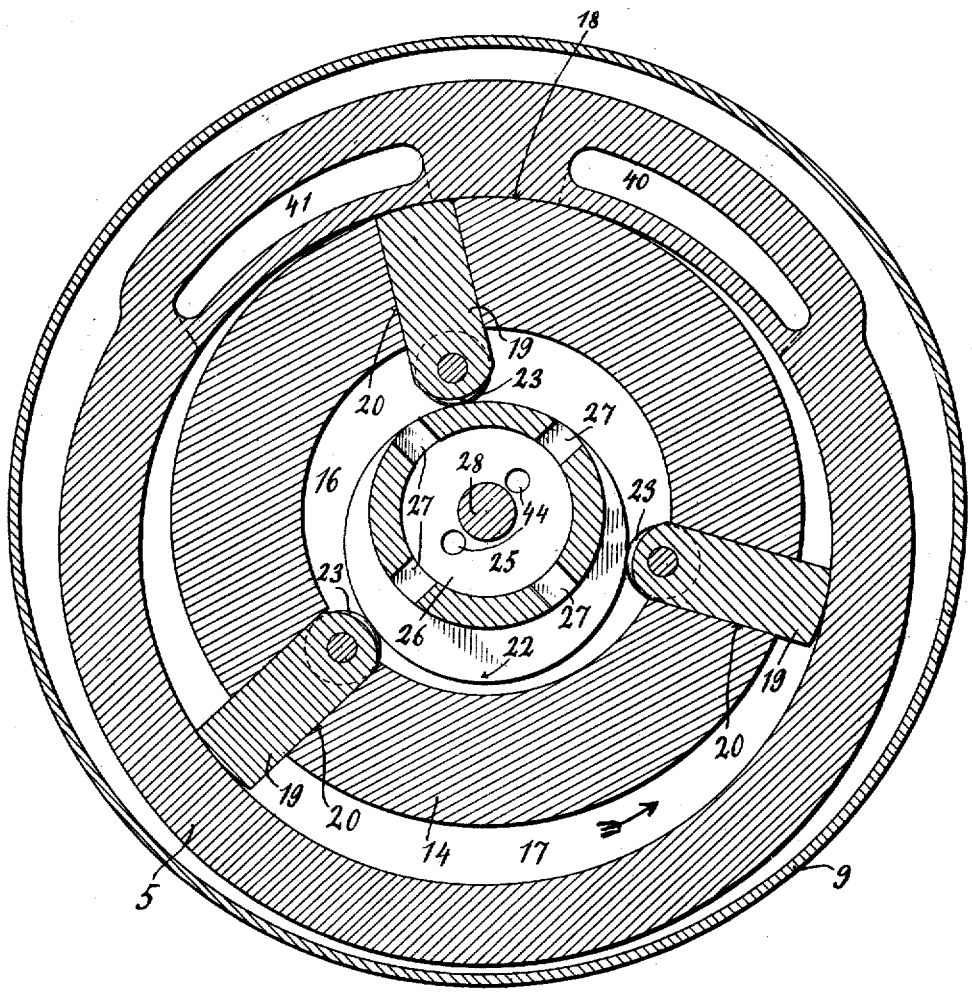

Figure 1 is a longitudinal section of the clutch mechanism on the line 1—1 of Fig. 2. Figs. 2 and 3 are cross sections on the lines 2—2 and 3—3 of Fig. 1.

The clutch mechanism consists essentially in a rotary pump, the driving shaft being connected to the rotor, and the driven shaft to the casing of the pump. When the fluid circulates freely through the pump casing, no motion is transmitted from the driving shaft, but upon throttling the fluid, a pressure is produced which reacts on the pump casing and thereby transmits the motion of the driving shaft to the driven shaft.

Referring specifically to the drawings, the casing of the mechanism is a cylinder 5 which is closed at its ends by heads 6 and 7, respectively, secured by cap screws 8. Over the cylinder is fitted a cover 9 to give a smooth appearance to the outside.

The head 7 has a bearing 10 through which a shaft 11 extends, the outer end of the bearing being provided with a suitable stuffing box 12. This shaft is the drive member, and it is fastened by a key or other suitable means 13 to a rotor 14 working in the bore of the cylinder 5. The rotor has a sliding fit at its ends with the heads 6 and 7, said heads being channeled as indicated at 15 to receive the ends of the rotor.

The rotor 14 has a central bore 16, and is mounted eccentrically in the bore of the cylinder 5, it being in contact with the wall thereof at one point, so that a crescent-shaped channel 17 is formed in the cylinder, the point of contact providing an abutment 18 which closes up the channel at this point. Into the channel 17 project impelling blades 19 carried by the rotor and having their outer ends in contact with the wall of the channel, said blades being arranged radially. The rotor has radial slots 20 in which the blades are slidably mounted.

On the inner face of the head 7 is a hollow cylindrical extension 21 which projects into the bore 16 and has a cam surface 22 which is engaged by anti-friction rollers 23 carried by the inner ends of the blades 19. This cam surface is concentric with the wall of the channel 17 which is engaged by the outer ends of the blades, so that said blades will slide back and forth in the slots 20 and stay in contact with said wall when the rotor is in motion. The outer end of the extension 21 is closed by a nut 24.

In the bore 25 of the extension 21 is mounted a sliding piston valve 26 which controls ports 27 establishing communication between said bore and the bore 16. The piston has a stem 28 which extends through a stuffing box 29 on the head 7, and a cage 30 mounted on said head. The cage permits access to the stuffing box.

To the cage 30 is made fast, by a key or other suitable means 31, a shaft 32 which is the driven shaft. This shaft has an axial bore 33 into which extends with a sliding fit the extension 34 of the valve stem 28, said extension carrying a transverse pin 35 which seats at its ends in an annular channel 36 in the inner periphery of a collar 37 loosely encircling the shaft 32 so that it may slide lengthwise thereon. The shaft 32 has a transverse slot 38 through which the ends of the pin 35 extend into the channel 36. To the collar 37 is connected a suitable operating lever 39, which lever is adapted to slide the collar back and forth on the shaft. This motion of the collar through the connection with the valve stem herein described, operates the valve 26, and the same is thus actuated to control the ports 27.

In the wall of the cylinder 5, on opposite sides of the abutment 18, are passages 40 and 41, respectively, said passages opening at one of their ends into the channel 17 on opposite sides of the abutment. Both passages also open through one of the ends of the cylinder. The passage 40 is in communication with a chamber 42 formed in the head 7, said chamber being in communication with the bore 25. The head 7 also has a chamber 43 which is in communication with the bore 16, and the passage 41 opens into this chamber.

The mechanism herein described operates as a pump, the reaction of the fluid against the wall of the cylinder 5 serving to transmit the motion of the shaft 11 to the shaft 32. The motive fluid employed will be oil, preferably.

The operation is as follows: Assuming the cylinder 5 to be at a standstill, and the shaft 11 to be in motion, with the valve 26 open as shown in Fig. 1 of the drawings. The rotor 14 is now in motion, and the oil is circulating through the pump, it passing from one side of the abutment 18 to the other side thereof. The course of the oil may be traced as follows: Assuming the rotor to be moving in the direction indicated by the arrow in Fig. 3, the oil is forced by the blades 19 from the channel 17 into the passage 40, and it flows out of the same into the chamber 42, and then passes into the bore 25, and through the ports 27 into the bore 16, from which latter it passes into the chamber 43, and then flows by the way of the passage 41 back into the channel 17. It will therefore be seen that there is a free circulation of oil through the pump. Upon partly closing the ports 27 by the valve 26, it will be evident that the flow of the oil is arrested, thereby creating a pressure in the various passages. This pressure reacts on the cylinder 5 and causes it to turn in the same direction as the shaft 11. The speed at which the cylinder rotates depends on the load or resistance of the shaft 32, and also on the extent to which the ports 27 are closed. If said ports are entirely closed, the shaft 32 will have the same speed as the shaft 11, irrespective of the power transmitted. The pressure is the same on both ends of the valve 26, in view of which the valve will remain in whichever position it may be placed without any locking means, and it can be readily moved back and forth at the will of the operator to control the ports 27 and thus make possible any speed from zero to full speed. The balancing of the valve is effected by providing small ports 44 therein which admit oil behind the valve. The motion of the cylinder 5 is transmitted through the head 7 and cage 30 to the shaft 32, said cage being keyed to the shaft as already described.

I claim:

1. A fluid clutch comprising a cylinder, a hollow rotor mounted eccentrically in the bore of the cylinder and in contact with the wall thereof at one point, the cylinder having passages opening at one of their ends into the bore of the cylinder on opposite sides of said point of contact, and said passages having their other ends opening through one end of the cylinder, a head on the last-mentioned end of the cylinder, said head having chambers which are in communication, respectively, with the aforesaid passages, one of said chambers also communicating with the bore of the rotor, and the other chamber communicating with the bore of the cylinder, a valve controlling the flow into the bore of the rotor, a driving element connected to the rotor, a driven element connected to the cylinder, radially sliding impeller blades carried by the rotor, and means for operating said blades.

2. A fluid clutch comprising a cylinder, a hollow rotor mounted eccentrically in the bore of the cylinder and in contact with the wall thereof at one point, the cylinder having passages opening at one of their ends into the bore of the cylinder on opposite sides of said point of contact, and said passages having their other ends opening through one end of the cylinder, a head on the last-mentioned end of the cylinder, said head having a ported tubular extension into the bore of the rotor, said head also having chambers which are in communication, respectively, with the aforesaid passages, one of said chambers also being in communication with the bore of the tubular extension, and the other chamber being in communication with the bore of the cylinder, a valve working in the bore of the tubular extension and controlling the ports thereof, a driving element connected to the rotor, a driven element connected to the cylinder, radially slidable impeller blades carried by the rotor, and means for operating said blades.

3. A fluid clutch comprising a cylinder, a hollow rotor mounted eccentrically in the bore of the cylinder and in contact with the wall thereof at one point, the cylinder having passages opening at one of their ends into the bore of the cylinder on opposite sides of said point of contact, and said passages having their other ends opening through one end of the cylinder, a head on the last-mentioned end of the cylinder, said head having a ported tubular extension into the bore of the rotor, said head also having chambers which are in communication, respectively, with the aforesaid passages, one of said chambers also being in communication with the bore of the tubular extension, and the other chamber being in communication with the bore of the cylinder, a perforated piston valve controlling the flow into the bore of the rotor, a driving element connected to the rotor, a driven element connected to the cylinder, radially slidable impeller blades carried by the rotor, and means for operating said blades.

4. A fluid clutch comprising a cylinder, a hollow rotor mounted eccentrically in the bore of the cylinder and in contact with the wall thereof at one point, the cylinder having passages opening at one of their ends into the bore of the cylinder on opposite sides of said point of contact, and said passages having their other ends opening through one end of the cylinder, a head on the last-mentioned end of the cylinder, said head having a ported tubular extension into the bore of the rotor, said extension having a cam surface, said head also having chambers which are in communication, respectively, with the aforesaid passages, one of said chambers also being in communication with the bore of the tubular extension, and the other chamber being in communication with the bore of the cylinder, a valve working in the bore of the tubular extension and controlling the ports thereof, a driving element connected to the rotor, a driven element connected to the cylinder, and radially slidable impeller blades carried by the rotor in contact at one of their ends with the aforesaid cam surface and at their other ends with the cylinder wall.

In testimony whereof I affix my signature in presence of two witnesses.

GUSTAVE T. JOHNSON.

Witnesses:
ANNA M. MENGEL,
H. G. BATCHELOR.